United States Patent [19]
Ohta et al.

[11] Patent Number: 4,735,099
[45] Date of Patent: Apr. 5, 1988

[54] DIRECT-HEATED GAS-FLOW MEASURING APPARATUS

[75] Inventors: Minoru Ohta, Okazaki; Kazuhiko Miura, Aichi; Seizi Huzino, Anjo; Kenji Kanehara, Aichi; Tadashi Hattori, Okazaki, all of Japan

[73] Assignee: Nippon Soken, Inc., Nishio, Japan

[21] Appl. No.: 935,109

[22] Filed: Nov. 24, 1986

Related U.S. Application Data

[63] Continuation of Ser. No. 727,263, Apr. 25, 1985, abandoned.

[30] Foreign Application Priority Data

May 9, 1984 [JP] Japan .................... 59-91041

[51] Int. Cl.$^4$ .............................. G01F 1/68
[52] U.S. Cl. ................................. 73/204
[58] Field of Search .................... 73/204, 118.1

[56] References Cited

U.S. PATENT DOCUMENTS

| | | |
|---|---|---|
| 3,900,819 | 8/1975 | Djorup . |
| 3,996,799 | 12/1976 | van Putten . |
| 4,196,622 | 4/1980 | Peter . |
| 4,294,114 | 10/1981 | Lauterbach . |
| 4,320,655 | 3/1982 | Kammermaier et al. ............ 73/204 |
| 4,341,114 | 7/1982 | Plapp . |
| 4,345,465 | 8/1982 | Gruner et al. . |
| 4,399,698 | 8/1983 | Hiromasa et al. . |
| 4,412,449 | 11/1983 | Eiermann et al. . |
| 4,472,239 | 9/1984 | Johnson et al. ................. 357/55 X |
| 4,498,337 | 2/1985 | Gruner ............................. 73/204 |
| 4,501,144 | 2/1985 | Higashi et al. . |
| 4,538,456 | 9/1985 | Gneiss et al. . |
| 4,542,650 | 9/1985 | Renken et al. . |
| 4,554,829 | 11/1985 | Sumal . |

FOREIGN PATENT DOCUMENTS

| | | |
|---|---|---|
| 0019135 | 4/1980 | European Pat. Off. . |
| 56-4014 | 1/1981 | Japan . |
| 56-7018 | 1/1981 | Japan . |
| 57-169618 | 10/1982 | Japan . |
| 1245138 | 9/1971 | United Kingdom . |
| 2025062 | 1/1980 | United Kingdom . |
| 2039051 | 7/1980 | United Kingdom . |
| 2043264 | 10/1980 | United Kingdom . |
| 2094985 | 9/1982 | United Kingdom . |

*Primary Examiner*—Herbert Goldstein
*Attorney, Agent, or Firm*—Cushman, Darby & Cushman

[57] ABSTRACT

A direct-heated gas-flow measuring apparatus including a measuring tube disposed in the gas stream, a film resistor for generating heat and detecting the temperature thereof, and a feedback control circuit for controlling the heat generated by the film resistor so that the temperature of the film resistor is a predetermined value. Provided in a supporting portion of the film resistor for supporting it to the measuring tube is an aperture for throttling the heat transfer thereof.

22 Claims, 6 Drawing Sheets

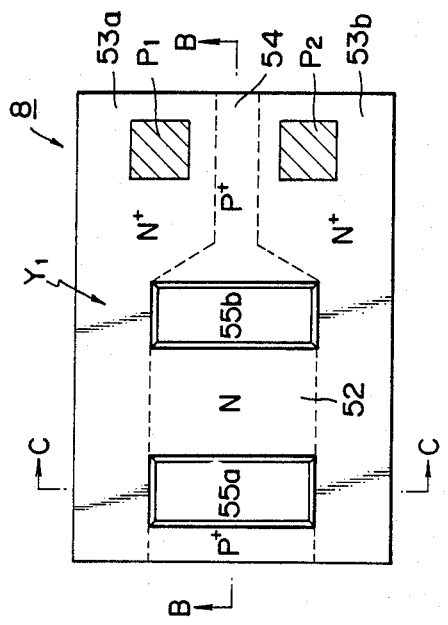
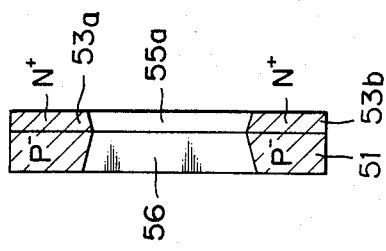
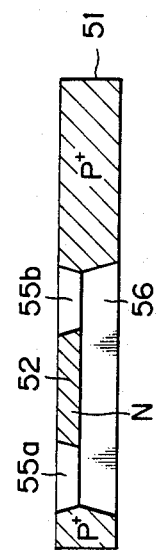

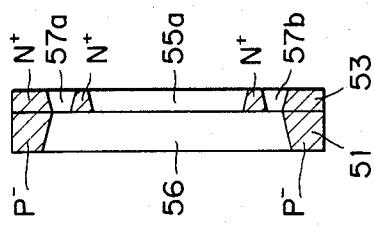
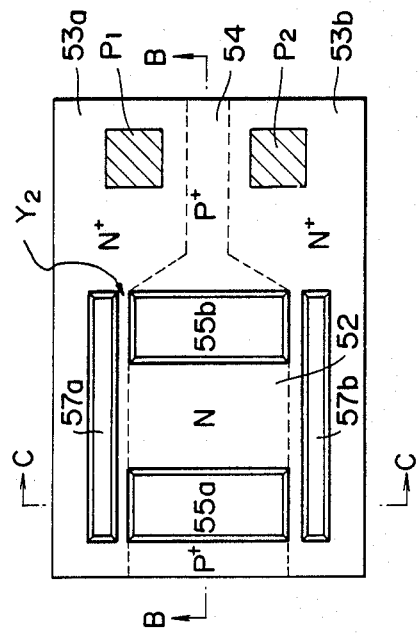
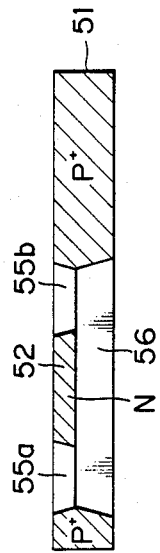

DIRECT-HEATED GAS-FLOW MEASURING APPARATUS

This is a continuation of application Ser. No. 727,263, filed Apr. 25, 1985, which was abandoned upon the filing hereof.

BACKGROUND OF THE INVENTION (1) Field of the Invention

The present invention relates to a direct-heated gas-flow measuring apparatus having a film resistor which serves as a temperature detecting means as well as an electric heater. Such a direct-heated gas-flow measuring apparatus can be used, for example, for measuring the flow rate of engine intake air.

(2) Description of the Related Art

Generally, in an internal combustion engine, the amount of intake air is one of the most important parameters for controlling the fuel injection amount, ignition timing, and the like. A gas-flow measuring apparatus, i.e., an airflow meter, is provided for measuring the same. One of the more common prior art airflow meters is the vane-type, which is, however, disadvantageous in scale, response speed characteristics, and the like. Recently, airflow meters having temperature-dependent resistors have been developed, which are advantageous in scale, response speed characteristics, and the like.

There are two types of airflow meters having temperature-dependent resistors, i.e., the heater-type and direct-heated type. The heater-type airflow meter may consist of an electric heater resistor provided in an intake-air passage of an engine and two temperaturedependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled for a constant difference in temperature between the two temperature-dependent resistors, thereby detecting the voltage applied to the heater resistor as the mass flow rate of air.

In this heater-type airflow meter, if no temperature-dependent resistor upstream is provided and the current of the heater resistor is controlled for a constant temperature of the downstream temperature-dependent resistor, the voltage applied to the heater resistor is detected as the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor for detecting the temperature of non-heated air. Thus, the current flowing through the film resistor is controlled for a constant difference in temperature between the film resistor and the temperature dependent resistor, thereby detecting the voltage applied to the film resistor as the mass flow rate of air. In this direct-heated type airflow meter, too, if no-temperature-dependent resistor is provided and the current of the heater resistor is controlled for a constant temperature of the film resistor, the voltage applied to the film resistor is detected as the volume flow rate of air.

Since the film resistor of the direct-heated type airflow meter serves as a temperature-detecting means for heated air, that is, no additional temperature detecting means for heated air is necessary, the directheated type airflow meter is smaller in size than the heater-type airflow meter.

In the direct-heated type airflow meter, the film resistor may consist of an insulating substrate such as a ceramic substrate or monocrystalline silicon substrate, a resistance pattern of platinum (Pt), gold (Au), etc. on the insulating substrate, and a heatresistant resin on the resistance pattern.

Usually, the response characteristics and dynamic range of the direct-heated type airflow meter are dependent upon the heat mass and adiabatic efficiency of the resistance pattern, which serves not only as a heating means but also as a temperature detecting means. In order to obtain the most excellent response characteristics and largest dynamic range, the resistance pattern should be ideally in a completely floating state in the air stream. In the prior art, however, the film resistor including the resistance pattern has had an approximately definite width over the lengthwise direction thereof. Accordingly, the adiabatic efficiency is relatively low, thus reducing the response characteristics and dynamic range of the heat-directed airflow meter.

SUMMARY OF THE INVENTION

It is an object of the present invention to provide a direct-heated gas-flow measuring apparatus with improved response characteristics and dynamic range.

Accordingly to the present invention, there is provided a direct-heated gas-flow measuring apparatus including a measuring tube disposed in the gas stream, a film resistor for generating heat and detecting the temperature thereof, and a feedback control circuit for controlling the heat generated by the film resistor so that the temperature of the film resistor is a predetermined value. Provided in a supporting portion of the film resistor for supporting it to the measuring tube is an aperture for throttling the heat transfer thereof.

BRIEF DESCRIPTION OF THE DRAWINGS

The present invention will be more clearly understood from the description as set forth below with reference to the accompanying drawings, wherein:

FIG. 5A is a plan view of a second embodiment of the film resistor according to the present invention;

FIGS. 5B and 5C are cross-sectional views taken along the line B—B and the line C—C of FIG. 5A;

FIG. 6A is a plan view of a third embodiment of the film resistor according to the present invention;

FIGS. 6B and 6C are cross-sectional views taken along the line B—B and the line C—C of FIG. 6A.

DESCRIPTION OF THE PREFERRED EMBODIMENTS

Figure 1:
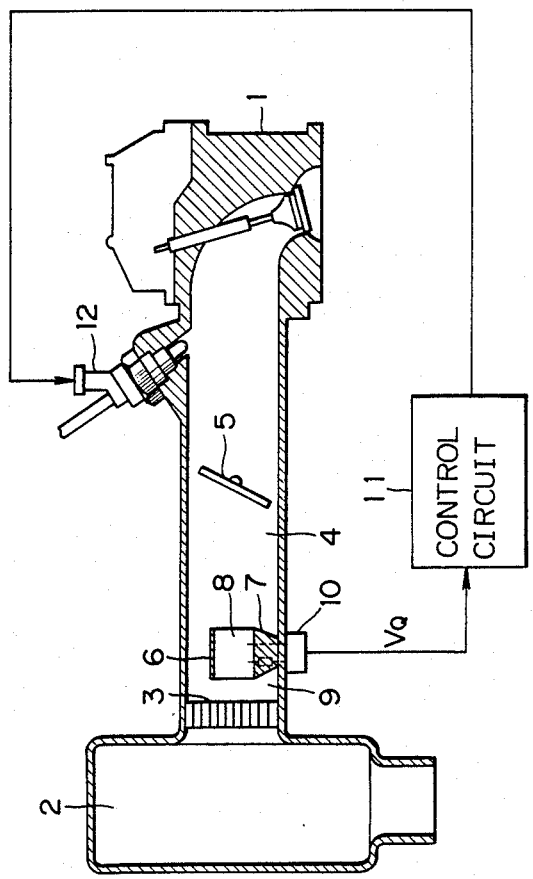
FIG. 1 is a schematic diagram showing the overall configuration of an internal combustion engine including a direct-heated type gas-flow measuring apparatus according to the present invention.

In FIG. 1, which illustrates the overall configuration of an internal engine including a gas-flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The gas-flow measuring apparatus is provided in the intake air passage 4 between the rectifier grid 3 and the throttle valve 5.

The gas-flow measuring apparatus includes a sensing portion inside of the intake air passage 4 and a sensing circuit 10 outside of the intake air passage 4. The sensing portion includes a measuring tube (or duct) 6 fixed by a stay 7 to the intake air passage 4. A film resistor 8 is provided inside of the duct 6, while a temperature-dependent resistor 9 for detecting the temperature of non-heated air is provided outside of the duct 6. The film resistor 8 and the temperature-dependent resistor 9 are connected to the sensing circuit 10 encapsulated in a hybrid board. Note that the temperature dependent resistor 9 can be disposed within the duct 6, under the condition that the resistor 9 is not substantially affected by the heat generated from the film resistor 8. The sensing circuit 10 controls the current flowing to the film resistor 8 to generate heat for a constant difference in temperature between the film resistor 7 and the temperature-dependent resistor 9. Also, the sensing circuit 10 generates an output voltage $V_Q$ and transmits it to a control circuit 11, which includes, for example, a microcomputer. The control circuit 11 also receives various kinds of detecting signals such as an engine speed signal Ne (not shown) and an engine coolant temperature signal THW (not shown) and controls the valve opening time period of a fuel injection valve 12 and the like.

Figure 2:
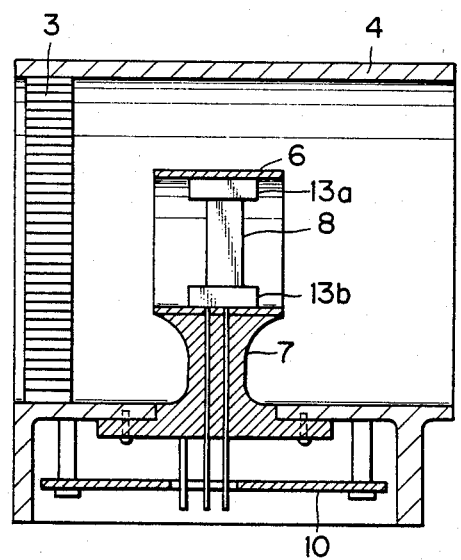
FIGS. 2 and 3 are longitudinal and traverse cross-sectional views, respectively, of the gas-flow measuring apparatus of FIG. 1.
Figure 3:
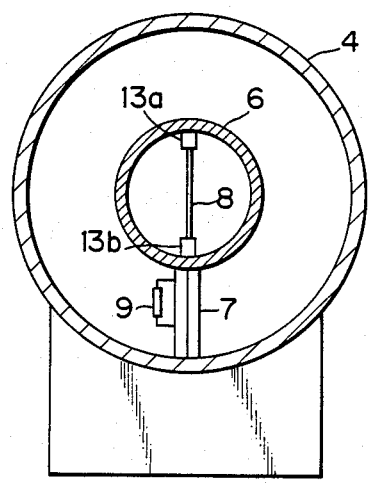

As shown in FIGS. 2 and 3, which illustrate the gas-flow measuring apparatus of FIG. 1, the ends of the film resistor 8 are fixed to supports 13a and 13b of the duct 6.

Figures 4A, 4B:
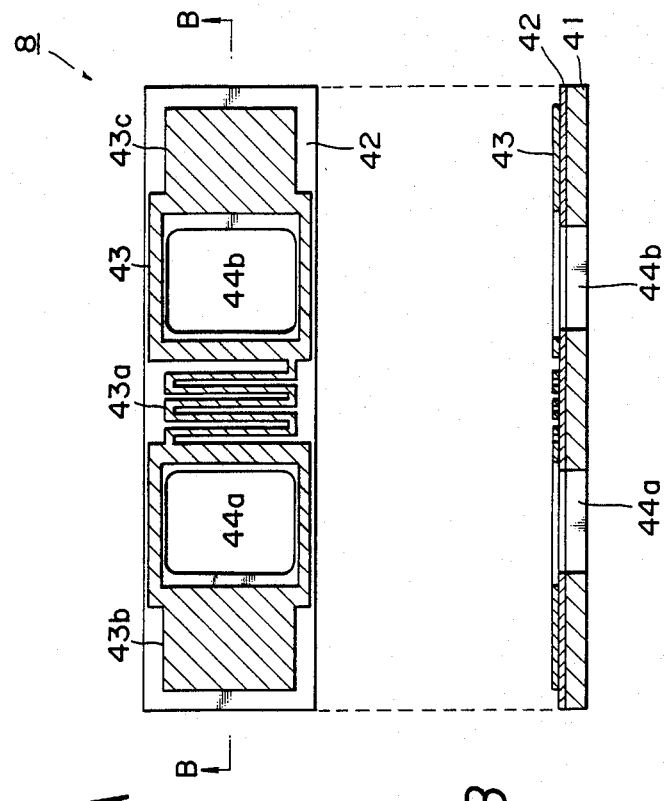
FIGS. 4A and 4B are plan and cross-sectional views, respectively, of a first embodiment of the film resistor according to the present invention.

FIG. 4A is a plan view of a first embodiment of the film resistor according to the present invention, and FIG. 4B is a cross-sectional view taken along the line B—B of FIG. 4A. In FIGS. 4A and 4B, the film resistor 8 includes a metal plate 41 having a thickness of about 20 to 50 μm on which an insulating layer 42 such as silicon dioxide ($SiO_2$) or silicon nitride ($Si_3N_4$) is formed. Further, a conductive layer 43 such as Pt or Au is formed thereon. The conductive layer 43 is patterned, as shown in FIG. 4A, by the conventional photolithography method. Particularly, the portion 43a of the patterned conductive layer 43 serves not only as heating means but also as temperature-detecting means. According to the present invention, apertures 44a and 44b are provided on the supporting portions of the film resistor 8, thereby increasing the adiabatic effect of the heating and temperature-detecting portion 43a.

In FIGS. 4A and 4B, reference numerals 43b and 43c indicate voltage applied portions. Also, an insulating layer or passivation layer such as $SiO_2$ or $Si_3N_4$ (not shown) is formed on the conductive layer 43.

In FIGS. 5A, 5B, and 5C, which illustrate a second embodiment of the present invention, the film resistor 8 includes a p⁻-type monocrystalline silicon substrate 51 on which an N-type monocrystalline silicon layer 52 is grown by the conventional epitaxial growth method. Formed in the N-type monocrystalline silicon layer 52 are N⁺-type diffusion regions 53a and 53b serving as low resistance layers and a P⁺-type diffusion region 54 for isolation between the regions 53a and 53b. Also, aluminum electrodes P₁ and P₂ are formed on the regions 53a and 53b, respectively. According to the present invention, apertures 55a and 55b are formed on both sides of the region 52, which serves not only as heating means, but also as temperature-detecting means, and an aperture 56 is formed on the back of the substrate 51. Thus, the adiabatic efficiency of the portion 52 is improved.

Note that the apertures 55a, 55b, and 56 of FIGS. 5A, 5B, and 5C can be formed by the anisotropic etching method. Also, a passivation layer (not shown) covers the entire film resistor 8.

In FIGS. 6A, 6B, and 6C, which illustrate a third embodiment of the present invention, additional apertures 57a and 57b are formed in the film resistor 8 of FIGS. 5A, 5B, and 5C. Thus, the adiabatic efficiency of the portion 52 is further improved.

In the above-mentioned second and third embodiments, it is possible to form a Pt or Au conductive layer instead of the diffusion regions 52, 53a, and 53b. However, the film resistor 8 using the diffusion regions has an advantage in that a bridge portion indicated by the arrow $Y_1$ or $Y_2$ in FIG. 5A or 6A has a lower resistance than the heating and temperature-detecting portion 52, thus improving the heat distribution thereof. Also, the film resistor 8 using the diffusion regions has an advantage in that no consideration of the adhesive intensity, the thermal expansion ratio, and the like for conductive layers is necessary.

Note that, in the above-mentioned first embodiment, the substrate 31 can be made of resin film such as heat-resisting polyimide on which a conductive layer or the like is formed.

Figure 7:
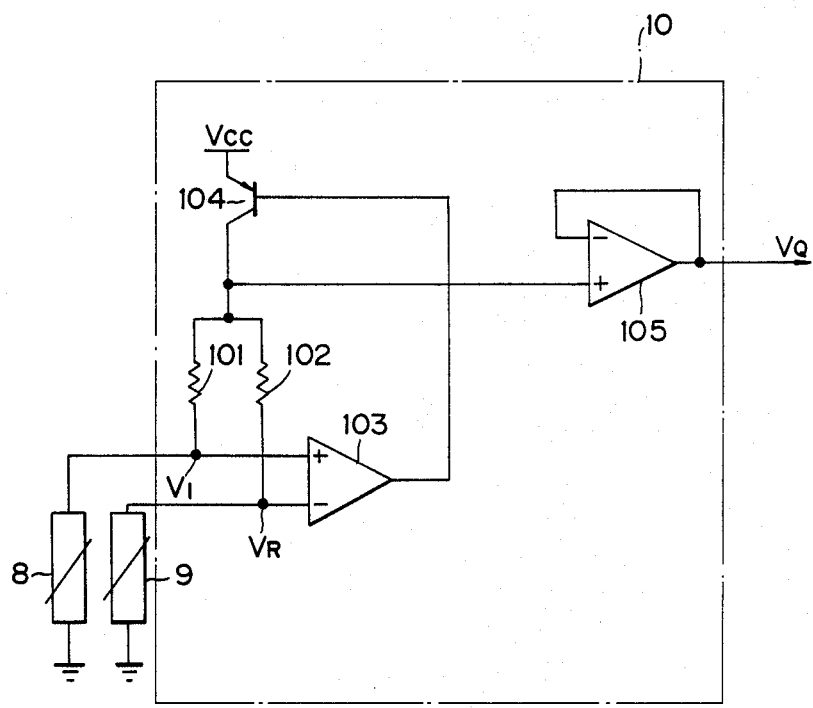
FIG. 7 is a circuit diagram of the sensing circuit of FIG. 1.

The sensing circuit 10 of FIG. 1 will be explained with reference to FIG. 7. In FIG. 7, the sensing circuit 10 includes resistors 101 and 102 which form a bridge circuit with the film resistor 8 and the temperature-dependent resistor 9; a comparator 103; a transistor 104 controlled by the comparator 103; and a voltage buffer 105. The sensing circuit 10 operates as follows. When the amount of air flowing through the intake air passage 4 increases, thus reducing the temperature of the film resistor 8, which, in this case, serves as a thermistor, the resistance value thereof decreases so as to satisfy the following condition:

$$V_1 < V_{R1}$$

where $V_1$ is the potential at the node between the resistor 101 and the film resistor 8 and $V_{R1}$ is the potential at the node between the resistor 102 and the temperature-dependent resistor 9. As a result, the output potential of the comparator 103 is reduced, thereby increasing the conductivity of the transistor 104. Therefore, the heat generated by the film resistor 8 is increased and, simultaneously, the collector potential of the transistor 104 is increased, so that the output voltage $V_Q$ of the voltage buffer 105 is also increased.

Contrary to this, when the amount of air flowing through the intake air passage 4 decreases, thus increasing the temperature of the film resistor 8, the resistance value thereof increases so as to satisfy the following condition:

$$V_1 > V_{R1}.$$

As a result, the output potential of the comparator 103 is increased, thereby decreasing the conductivity of the transistor 104. Therefore, the heat generated by the film resistor 8 is decreased and, simultaneously, the collector potential of the transistor 104 is decreased, so that the output voltage $V_Q$ of the voltage buffer 105 is also decreased.

Thus, feedback control is performed upon the temperature of the film resistor 8 for a constant difference in temperature between the film resistor 8 and the temperature-dependent resistor 9, which, in this case, detects the temperature of ambient air. Thus, the output voltage $V_Q$ of the output buffer 105 indicates the amount of air flowing through the intake air passage 4.

As explained hereinbefore, according to the present invention, due to the throttling of the heat transfer for the heating and temperature-detecting portion of the film resistor, the adiabatic effect can be improved, thus improving the response characteristics and the dynamic range of the gas-flow measuring apparatus.

We claim:

1. A direct-heated gas-flow measuring apparatus comprising:
    a measuring tube adapted to be disposed in a gas stream to be measured;
    a film resistor, disposed within said measuring tube, having a sensing portion for generating heat and sensing the temperature thereof, and a supporting portion, fixed to said measuring tube, for supporting said sensing portion with a bridge portion, said film resistor having an aperture along said sensing portion between said sensing portion and said supporting portion in order to throttle heat transfer from said sensing portion to said supporting portion, said sensing portion, said supporting portion, and said bridge portion being parallel to the gas stream, one inner face of said sensing portion and said bridge portion, which inner face is within said aperture and is opposed to the gas stream being tapered; and
    control means, connected to said film resistor, for controlling the heat generated therefrom.

2. An apparatus according to claim 1, wherein said sensing portion and said bridge portion are thinner than said supporting portion.

3. An apparatus according to claim 2, wherein said sensing portion is substantially 20 to 50 μm in thickness.

4. An apparatus according to claim 1, wherein said film resistor is made of a semiconductor material.

5. An apparatus according to claim 4, wherein said aperture comprises an aperture formed by anisotropic etching operation of said semiconductor material.

6. An apparatus according to claim 4, wherein said sensing portion comprises a portion of semiconductor material that is doped with impurities.

7. A direct-heated gas-flow measuring apparatus comprising:
    a measuring tube adapted to be disposed in a gas stream to be measured;
    a film resistor, disposed within said measuring tube, having a sensing portion for generating heat and sensing the temperature thereof, and a supporting portion, fixed to said measuring tube, for supporting said sensing portion with plural supporting bridges, said film resistor having a plurality of apertures along said sensing portion between said sensing portion and said supporting portion in order to throttle heat transfer from said sensing portion to said supporting portion, said sensing portion and supporting portion being parallel to the gas stream, an inner face of said sensing portion, which inner face is within a least one of said aperatures and is opposed to the gas stream being tapered; and
    control means, connected to said film resistor, for controlling the heat generated therefrom.

8. An apparatus according to claim 7, wherein said aperture has a rectangular shape.

9. An apparatus according to claim 7, wherein said apertures are formed on upstream and downstream sides of said sensing portion.

10. An apparatus according to claim 9, wherein said apertures are formed on both sides of said sensing portion.

11. An apparatus according to claim 7, wherein said sensing portion and said bridge portion are thinner than said supporting portion.

12. An apparatus according to claim 11, wherein said sensing portion is substantially 20 to 50 μm in thickness.

13. An apparatus according to claim 7, wherein said film resistor is made of a semconductor material.

14. An apparatus according to claim 13, wherein said apertures are formed by anisotropic etching of said semiconductor material.

15. An apparatus according to claim 13, wherein said sensing portion comprises a portion of semiconductor material that is doped with impurities.

16. A direct-heated gas-flow measuring apparatus comprising:
    a measuring tube adapted to be disposed in a gas stream to be measured;
    a film resistor, disposed within said measuring tube, having a sensing portion for generating heat and sensing the temperature thereof, and a supporting portion, fixed to said measuring tube, for supporting said sensing portion with plural supporting bridges, said film resistor having a plurality of apertures around said sensing portion for throttling heat transfer from said sensing portion to said supporting portion, said sensing portion and supporting portion being parallel to the gas stream, at least two inner faces of said sensing portion, which inner faces are within respective apertures and which are opposed to the gas stream being tapered; and
    control means, connected to said film resistor, for controlling the heat generated therefrom.

17. An apparatus according to claim 16, wherein said apertures are formed on upstream and downstream sides of said sensing portion.

18. An apparatus according to claim 16, wherein said apertures are formed on opposite sides of said sensing portion.

19. An apparatus according to claim 16, wherein said sensing portion is substantially 20 to 50 μm in thickness.

20. An apparatus according to claim 16, wherein said film resistor is made of a semiconductor material.

21. An apparatus according to claim 20, wherein said apertures are formed by anisotropic etching of said semiconductor material.

22. An apparatus according to claim 20, wherein said sensing portion comprises a portion of semiconductor material that is doped with impurities.

* * * * *